United States Patent [19]

Smyth

[11] Patent Number: 5,075,770
[45] Date of Patent: * Dec. 24, 1991

[54] COLOR BALANCED IMAGE DETECTOR SYSTEM

[75] Inventor: William K. Smyth, Sudbury, Mass.

[73] Assignee: Polaroid Corporation, Cambridge, Mass.

[ * ] Notice: The portion of the term of this patent subsequent to Dec. 25, 2007 has been disclaimed.

[21] Appl. No.: 328,314

[22] Filed: Mar. 24, 1989

[51] Int. Cl.$^5$ .......................... H04N 9/73; H04N 1/46
[52] U.S. Cl. ........................................ 358/80; 358/75; 358/41; 358/29
[58] Field of Search ..................................... 358/75-80, 358/213.11, 213.15, 27, 29 C, 50, 41; 250/234, 235, 236, 226

[56] References Cited

U.S. PATENT DOCUMENTS

| | | | |
|---|---|---|---|
| 4,256,959 | 3/1981 | Monette | 358/212 |
| 4,555,731 | 11/1985 | Zinchuk | 358/24 |
| 4,558,357 | 12/1985 | Nakagawa et al. | 358/75 |
| 4,663,535 | 5/1987 | Nakai et al. | 358/75 |
| 4,663,656 | 5/1987 | Elabd et al. | 358/75 |
| 4,667,253 | 5/1987 | Chen | 358/293 |
| 4,763,189 | 8/1988 | Komatsu et al. | 358/75 |
| 4,805,012 | 2/1989 | Agostinelli et al. | 358/75 |
| 4,837,630 | 6/1989 | Ueda | 358/213 |
| 4,866,512 | 9/1989 | Hirosawa et al. | 358/75 |
| 4,882,620 | 11/1989 | Shimizu et al. | 358/75 |
| 4,980,759 | 12/1990 | Smyth | 358/75 |
| 4,985,760 | 1/1991 | Maeshima et al. | 358/50 |

FOREIGN PATENT DOCUMENTS

| | | | |
|---|---|---|---|
| 348572 | 1/1972 | Japan | 358/75 |
| 0002038 | 1/1982 | Japan | 358/77 |

Primary Examiner—James J. Groody
Assistant Examiner—Michael H. Lee
Attorney, Agent, or Firm—Edward S. Roman

[57] ABSTRACT

An imaging system for producing multicolor images of a scanned subject includes a plurality of detector assemblies. Each of the detector assemblies is sensitive to a specific color. Typically, red, green, and blue detector assemblies are employed for converting images in the primary colors to the desired output image. Each detector assembly includes multiple rows of CCD detector elements positioned in registration with each other for a two-dimensional array of the detectors. Pixels of the subject are viewed repetitively by the successive detectors of the column to provide for an integrated detector signal. The number of detector elements in each column is varied in accordance with the color sensed by each assembly to provide for greater integration of low-intensity portions of the spectrum. This compensates the output image for variations in filter attenuation, lamp illumination, and CCD sensitivity as a function of light wavelength. The mode of compensation preserves a high signal-to-noise ratio.

16 Claims, 8 Drawing Sheets

COLOR BALANCED IMAGE DETECTOR SYSTEM

BACKGROUND OF THE INVENTION

This invention relates to the detection of light from a subject to obtain data suitable for the formation of an image of the subject and, more particularly, to the scanning of light past groups of photodetectors arranged in rows transverse to a path of the scanning, and wherein each group of photodetectors is responsive to a separate portion of a spectrum of the light.

The term "light" as used herein includes the visible spectrum as well as invisible spectra such as ultraviolet light and infrared light. The photodetectors employed in the selection of the light are fabricated generally of semiconductor materials responsive to radiation of a specific part of the electromagnetic spectrum such as infrared detectors or detectors of visible light. It is common practice today to construct an array of photodetectors upon a common substrate of semiconductor material.

An array of photodetectors is particularly useful in the scanning of light emitted by or reflected from a subject to obtain data of the subject which can be used in the construction of an image of the subject. By scanning the light of the subject past a set of photodetectors, each of the photodetectors provides a signal in response to the incident light. Preferably, the scanning is accomplished along a path perpendicular to a line array of the photodetectors. For each scan line, the amplitudes of the signals as a function of time represents one line of pixels (picture elements) in an image of the subject.

Typically, the output signal of each photodetector is connected to electronic circuitry which samples the output signal at a rate synchronized with a rate of the light scanning so as to provide a predetermined number of signal samples for each line scanned. Signal processing circuitry extracts the various signal samples from the photodetectors, and arranges the samples to form an image of the subject. Various forms of filtering may be employed on each signal sample, or on a succession of the samples to reduce the influence of noise so as to enhance the image.

A problem arises in that detector elements have a responsivity to light which varies with the frequency of the light. The effects of the varying responsivity are compounded by the fact that, in the case of illumination of the subject by an external source of light, the source of light may have an intensity which also varies as a function of frequency. As a result, these systems are limited in their capacity to produce accurately a multicolored image of the subject.

For example, one method of producing a multicolored image is to employ red, green and blue filters in front of the array of photodetectors to obtain images in the primary colors of red, green, and blue. The three images are combined to produce the desired multicolor image. However, in view of the foregoing variation in illuminating light and in detector responsivity as a function of light frequency, the relative intensities of the images in the primary colors may be in error. An attempted correction of the situation to produce uniformity by attenuating the signal of the color image having an excessive intensity simply worsens the signal-to-noise ratio with a resultant degradation of the multicolor image.

SUMMARY OF THE INVENTION

The foregoing problems are overcome and other advantages are provided by an imaging system employing plural sets of detectors to provide color balanced detection and imaging of a scanned subject. In a preferred embodiment of the invention, the subject, such as a color photograph, is physically moved across the field of view of the detectors to provide a scanning of the subject line by line. Other forms of scanning may be employed if desired. The detectors in each set of detectors are sensitized to a specific portion of the spectrum. In the case of a viewing of a color subject in the visible portion of the spectrum, red, green, and blue filters may be employed with respective ones of the detector sets to sensitize the respective detectors to the primary colors which will be employed in the construction of a color image of the subject.

In accordance with a feature of the invention, plural sets of detectors provide compensation for spectral variations in illumination of the subject, in attenuation of the filters, and in sensitivity of the photodetectors for accurate rendition of color in the image. This is accomplished by arranging the detectors, in each of the detector sets, in an array of rows and columns. The columns are parallel to the scanning path, and the rows are transverse to the scanning path. The detectors are constructed of photosensitive CCD's (charge coupled devices) which operate by producing a quantity of electric charge in response to a reception of incident light. The amount of charge produced in a cell of the CCD array is dependent on the intensity of the incident light, and increases with increasing intensity.

A useful feature of the two-dimensional CCD array, wherein individual cells of the array are arranged in rows and columns, is the fact that charge can be transferred from cell to cell along a row of the array as well as from cell to cell along a column of the array. Suitable gating circuits are available for accomplishing the transfer of quantities of charge from cell to cell. Also, an electrode structure is included with each cell to activate the cell for responding to light only during a specific sampling interval of time.

The foregoing feature of a CCD array is used to advantage in the construction of the invention by limiting the amount of charge produced at each sampling of incident light to an amount of charge which is well below the maximum amount of charge which can be held in a CCD cell. For example, in a set of detectors having twelve active rows of CCD cells, the scanning optics is arranged to transmit the incident light to induce an increment in charge of a CCD cell which is no greater than one-twelfth of the total charge capacity of a cell. In the case of a detector set having sixteen active rows of detector elements, the foregoing charge limitation is limited to one-sixteenth of the maximum charge which can be stored in a CCD cell.

Scanning of the subject past the detector arrays is synchronized with the sampling so that the first detector element, or CCD cell, in each row receives data from the same pixel of the subject. As the pixel advances from row to row, the charge produced in the cell of a previous row is transferred by the gating circuitry to the cell of the next row. This results in a summation of the charges produced by successive samplings of the aforementioned pixel as the pixel is scanned past successive rows of detectors in a detector set. The resultant charge accumulated at the last row of detectors has a much higher signal-to-noise ratio (SNR) than would be the case for detection of a pixel by a single detector. In the case of a detector system employing three sets of detectors, respectively, for the red, the green, and the blue primary colors, the foregoing summation of charge occurs in each column of the detector arrays in each of the detector sets.

The invention attains uniformity on color responsivity by employing a different number of active detector rows in each of the detector sets. It is noted that, as a convenience in manufacture, each of the detector sets may be constructed of the same number of detector rows, for example, sixteen rows. Only a relatively small number of these rows are to be activated to detect light from that portion of the spectrum having a relatively strong intensity of light while, in the case of a portion of the spectrum having a relatively weak light, a relatively large number of the rows are activated. Typically, the red portion of the spectrum produces the strongest illumination and the blue portion of the spectrum produces the weakest illumination. Accordingly, the smallest number of active detector rows is in the red set of detectors and the largest number of activated rows is in the blue set of detectors.

In each of the foregoing sets of detectors, in addition to the rows of CCD's which may serve as detectors of light, there is an additional row of CCD's which receive the sum charge from each of the column of CCD cells, this last row of CCD cells being employed as an analog shift register for transferring the sum charges from cell to cell along the row, thereby to extract output signals of the detection process from the array. A set of output signals is extracted for each scan line in each CCD array. The red, green and blue signals may be processed as by filtering and scaling, if desired, for enhancement of the resultant image. These signals are then employed, in accordance with well-known image processing technology, to construct a multicolor image of the subject.

BRIEF DESCRIPTION OF THE DRAWING

The aforementioned aspects and other features of the invention are explained in the following description, taken in connection with the accompanying drawing wherein.

DETAILED DESCRIPTION

Figure 1:
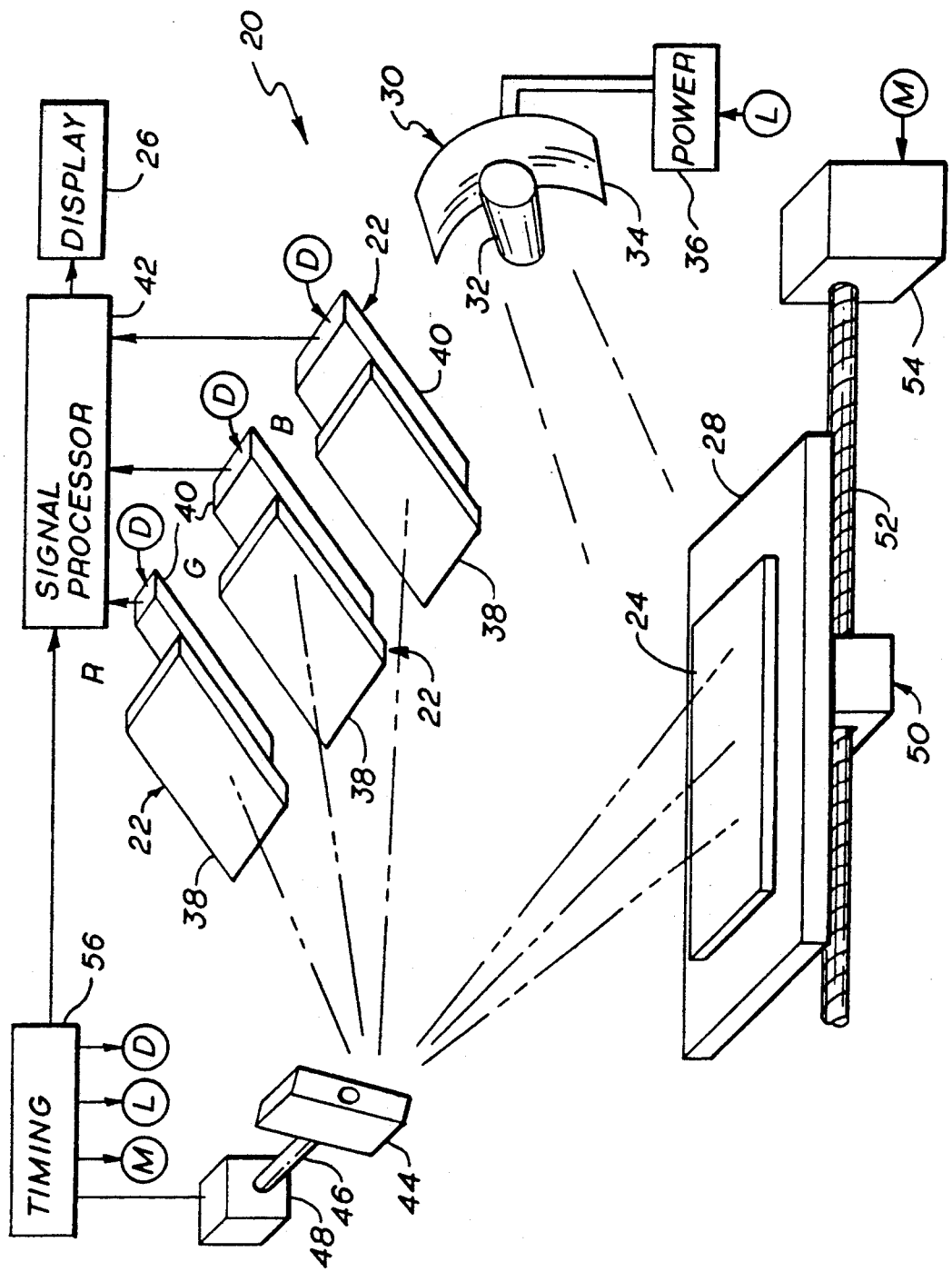
FIG. 1 is a stylized diagrammatic view of an imaging system incorporating the invention, the view showing alternative modes of scanning a subject to be viewed by plural arrays of detectors.

FIG. 1 shows an imaging system 20 employing plural detector assemblies 22 positioned for viewing a subject 24 to produce an image of the subject 24 on a display 26. The subject 24, which may be a multicolor photograph or other picture, by way of example, is supported on a table 28 and is illuminated by light of a lamp 30. By way of example, the lamp 30 may comprise an incandescent bulb 32 positioned in front of a concave reflector 34 for directing rays of light towards the subject 24. The bulb 32 is energized with electric current from a power supply 36.

Each of the detector assemblies 22 includes a filter 38 and a circuit module 40 mounted behind the filter 38. The characteristics of the filter 38 differ for each of the detector assemblies 22, there being a red (R) filter 38 for a first of the assemblies 22, a green (G) filter 38 for a second of the assemblies 22, and a blue (B) filter 38 for a third of the assemblies 38. In practice, the circuit modules 40 would have the same physical size. However, in order to emphasize the inventive feature wherein different numbers of rows of detectors are activated for each of the colors in order to compensate for differences in spectral responsivity, the module 40 shown behind the red filter is shown having a narrow configuration, the module 40 behind the green filter is shown having a medium-size width, and the module 40 behind the blue filter is portrayed with a maximum width. The circuit modules 40 output signals in response to the reception of incident light, the signals outputted by the modules 40 being applied to a signal processor 42 for generation of the image to be presented on the display 26.

In order to demonstrate the scanning aspect of the imaging system 20, two possible modes of scanning are shown in FIG. 1, namely, a mirror 44 and associated optics (not shown) which is rotated about a shaft 46 of a motor 48, and a lead screw drive 50 which translates the table 28 in response to rotation of a lead screw 52 by a motor 54. Rotation, or pivoting, of the mirror 44 and translation of the table 28 are synchronized with operation of the detector assemblies 22 and the signal processor 42 by a timing unit 56 which provides timing signals for driving the motors 48 and 54 and for operating the circuit modules 40 and the processor 42. If desired, a timing signal, outputted by the unit 56 at terminal L may be employed for activating the power supply 36 for lighting the lamp 30 a predetermined amount of time prior to operation of either of the scanning devices to insure that the temperature of the bulb 32 has stabilized for a uniform spectral output to the light. Signals from the timing unit 56 to the motor 54 and to the detector assemblies 22 are indicated, respectively, by terminals labeled M and D.

It is to be understood that, in practice, only one of the scanning devices of FIG. 1 would be employed in the operation of the system 20. For example, if scanning is to be done by operation of the mirror 44, then the lead screw drive 50 and the table 28 would remain stationary. Alternatively, if scanning is to be done by translation of the table 28, then the mirror 44 would remain stationary while the lead screw 52 would rotate to translate the table 28 and the subject 24. Yet a third configuration of the scanning device, with use of a rotating drum, is to be employed in the preferred embodiment of the invention as will be described subsequently with reference to FIG. 5.

Figure 2:
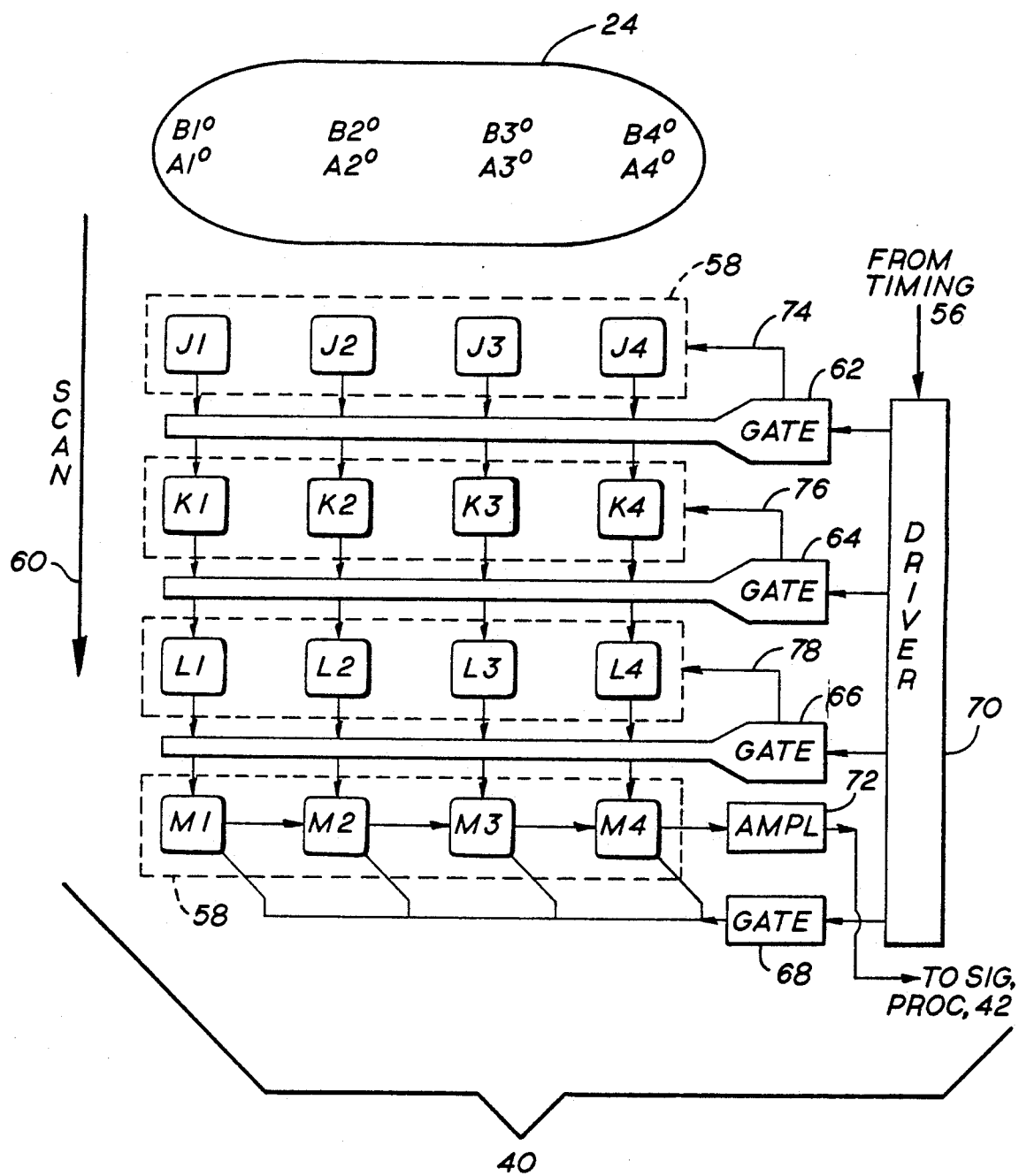
FIG. 2 shows diagrammatically an array of charge-coupled devices employed as detectors with interconnection of the devices by gating circuitry.

FIG. 2 shows details in the construction of a circuit module 40 of FIG. 1. Each of the modules 40 is constructed in the same fashion. The module 40 comprises a plurality of CCD registers 58 positioned transversely to a direction of a scanning of a light beam incident upon a detector assembly 22 (FIG. 1) in response to a scanning of the subject by either the mirror 44 or the drive 50 (FIG. 1). The direction of scanning is indicated by an arrow 60. In FIG. 2, the subject 24 is shown as having an arbitrary shape, and further includes two rows of four pixels each. The pixels are presented as little circles identified by the legends A1-A4 in the first row, and B1-B4 in the second row. In the preferred embodiment of the invention, 16 of the registers 58 are employed in the CCD array of detectors, with each register having 2048 cells capable of detection of light. A further register is employed for extracting signal samples obtained from the detection of light by cells of the CCD array. The signal samples are obtained from a plurality of the other sixteen registers.

By way of example, and to simply the description, the portrayal of the circuit module 40 in FIG. 2 shows a total of only four registers 58 each of which has only four cells. In the uppermost register 58, the cells are identified by the legends J1-J4; in the next register 58, the cells are identified by the legends K1-K4; and in the following register the cells are identified by the legends L1-L4. These three registers are employed for the detection of light. The last of the registers 58, at the bottom of the array of FIG. 2, has cells identified by the legends M1-M4, and is employed for extracting signal samples from the module 40. Also included within the circuit module 40 is a set of gates 62, 64, 66, and 68 which are driven by a gate driver 70. An amplifier 72 is connected to an output terminal of the fourth register 58 for applying signals outputted by the fourth register 58 to the signal processor 42.

In operation, the gate 62 applies a signal via line 74 to activate an electrode assembly (not shown) in each of the cells J1-J4 to render these cells responsive to incident light for detecting the light during a sampling interval of time designated by an electrical pulse signal on line 74. Similarly, the gate 64 applies a sample pulse signal via a line 76 to activate the corresponding electrode structures (not shown) of the cells K1-K4, and the gate 66 similarly applies, via line 78, an electric pulse signal to the electrode structures of the cells L1-L4 to initiate sampling of incident light by the cells. Circuitry of the gate 62 also extends between the first two registers 58 for transferring charge between a first cell in each column to a second cell in each column. Thus, upon activation of circuitry within the gate 62, charge in the cell J1 is transferred into the cell K1, charge in the cell J2 is transferred to the cell K2, with similar charge transfers being accomplished between the cells J3-K3 and J4-K4. In a similar fashion, circuitry of the gate 64 and of the gate 66 provides for further transfer of charge among the cells of the individual columns, namely, successive transfers of charge among the cells K1-L1-M1 through K4-L4-M4. Circuits of the gates 62, 64, 66, and 68 are activated by the driver 70 in response to signals of the timing unit 56. The array of the charge-coupled devices of the four registers 58 in conjunction with the circuits of the gates 62, 64, 66, and 68 operate in accordance with a gating procedure known as a three-phase gating operation.

Figure 3:
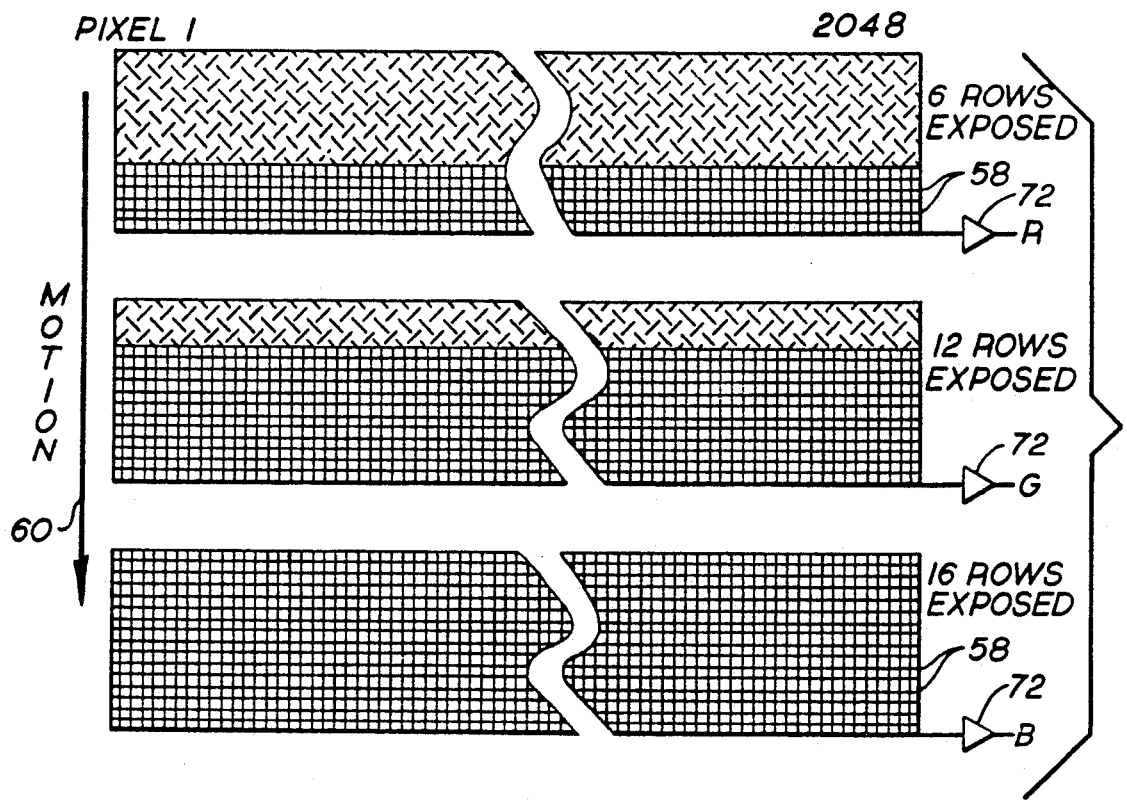
FIG. 3 shows three sets of detectors employed respectively in three detector assemblies of FIG. 1, FIG. 3 showing diagrammatically the activation of different numbers of rows of detectors in each of the assemblies, the assemblies being responsive to different colors of the spectrum.
Figure 4:
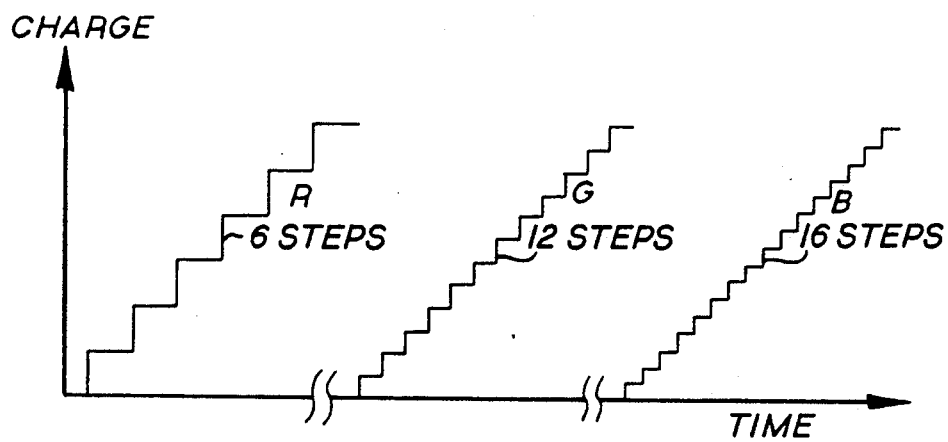
FIG. 4 demonstrates graphically the accumulation of charge in columns of the detectors of FIG. 3, each of the detectors being charge-coupled devices connected for summing charges of six cells, twelve cells and sixteen cells, respectively, of the red, the green, and the blue arrays of FIG. 3.

With reference also to FIGS. 3 and 4, there are shown further aspects in the summation of signals in the various columns of the array of FIG. 2. FIG. 3 shows three detector arrays of the three detector assemblies 22 of FIG. 1, namely, the red assembly, the green assembly, and the blue assembly. In the red array, shown at the top of FIG. 3, there are only six of the registers 58 exposed to incident light, the remaining ten registers being covered from the light so as to render them nonresponsive to the incident light. In the green array, shown in the middle of FIG. 3, there are twelve rows of registers 58 exposed for detection of incident light. In the blue array at the bottom of FIG. 3, there are sixteen rows of registers 58 exposed for the selection of incident light. The bottom register of FIG. 2 containing the cells M1-M4 is represented in each of the three arrays of FIG. 3 as a solid line at the bottom of the array to simplify the drawing in FIG. 3.

The aspect of summation for integration of the signals obtained from each pixel of the subject for forming the corresponding pixel of the image may be explained with reference to FIGS. 2, 3, and 4. Consider the pixel A1 (FIG. 2) in the subject 24. During an early part of the scan, the pixel A1 reflects light of the lamp 30 to be detected by the cell J1 of the charge-coupled device of the register 58. The cell J1 produces an electric charge proportional to the reflectivity of light from the pixel A1. The resulting charge produced in the cell J1 is transferred by the gate 62 to the cell K1. Subsequently, as the scanning motion of the rays of light continue, rays of light from the pixel A1 impinge upon the cell K1. At this point in time, the driver 70 activates circuitry of the gate 64 to energize the electrode structure of all of the cells of the second register 58, thus enabling the cell K1 to sample the light from the pixel A1.

Upon a sampling of the light of pixel A1 by cell K1, additional charge is produced by the cell K1. The total charge now present in the cell K1 is equal to the sum of the charges produced by the detection operations of cells J1 and K1. Thereafter, the gate 64 transfers the charge from K1 to the cell L1, this being followed by a further sampling of light of the pixel A1 with the further production of charge to produce a total charge accumulation in the cell L1 equal to the sum of the charges produced by the detection of light from the pixel A1 by the cells J1, K1, and L1.

At the time when the cell K1 is being activated to sample light of the pixel A1, the cell J1 is being activated to sample light of the pixel B1. Therefore, the sum of charges appearing in cell L1 at the conclusion of three sampling intervals of the pixel A1 is succeeded in next sampling interval with a sum of the charges from the sampling of the pixel B1. Similar comments apply to the summation of pixel signals via the columns J2-K2-L2, J3-K3-L3, and J4-K4-L4. At the conclusion of the sampling of the respective rows of pixels by the third register 58, the resultant accumulated charges are transferred by the gate 66 to the corresponding cells M1-M4 of the fourth register 58. Thereupon, the gate 68 is activated by the driver 70 in response to timing signals from the timing unit 56 to strobe the cells M1–M4 to shift the charges through the fourth register 58 and via the amplifier 72 to the signal processor 42. Thus, the accumulated charge in cell M4 is transferred out by the amplifier 72, the accumulated charge in the cell M3 is transferred into the cell M4, the accumulated charge in the cell M2 is transferred into the cell M3, and the accumulated charge of the cell M1 is transferred into the cell M2. Subsequent transfers allow the various quantities of charge to move sequentially through the cells of the fourth register 58 to be stored in the processor 42 for subsequent use in forming the image. The charges of the fourth register 58 are cleared out completely prior to the next sampling interval, so as to be ready to receive charges from the next row of pixels.

The summation of the relatively high intensity red signals is accomplished within six scanning intervals by use of the six registers 58 shown at the top of FIG. 3. The summation, or integration, of the six signal samples is represented graphically in the left hand trace of the graph of FIG. 4. The signal samples, herein, are understood to be the charges produced in the CCD cells in response to the viewing of a sample of the incident light. The weaker green signals outputted by cells of the green array are attained through twelve steps of summation, indicated in the middle trace of FIG. 4, and are produced by use of the twelve registers 58 of the green array. Similarly, the weakest blue signals are accumulated via sixteen steps, shown in the right hand trace of FIG. 4, and are produced by summation of the samples attained by the sixteen rows of the blue array at the bottom of FIG. 3.

As noted in FIG. 1 and FIG. 3, the detector arrays of the three assemblies 22 are arranged side-by-side. Therefore, the pixel A1 (FIG. 2) is first detected by elements of the red assembly 22, and thereafter by elements of the green assembly 22, and finally by the elements of the blue assembly 22. Thus, the signal processor 42 receives red image data, green image data, and blue image data. The image data of the various pixels of the three different colored images are placed in registration by the processor 42, in accordance with well-known image processing operations, to provide an output colored image on the display 26, as by illuminating red, green and blue phosphors of a television type of screen (not shown) in the display 26.

Figure 5:
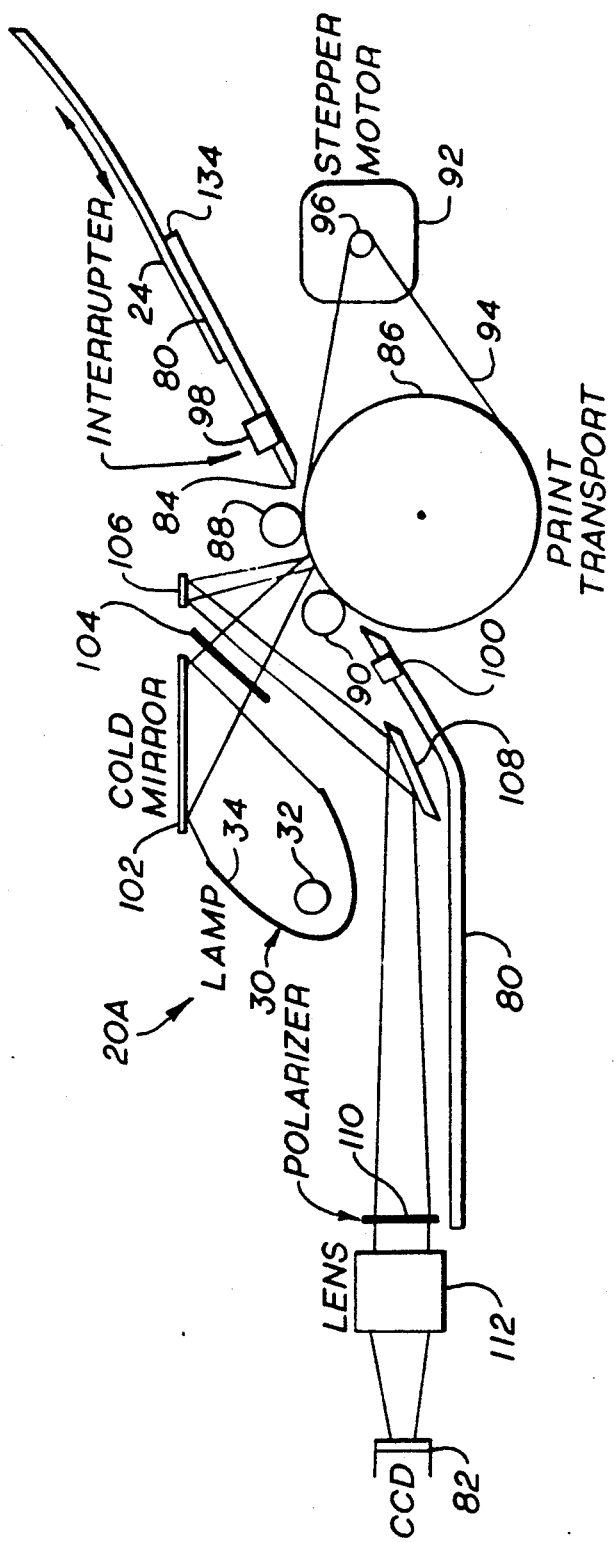
FIG. 5 is a diagrammatic view of an imaging system of FIG. 1, constructed in accordance with a preferred embodiment of the invention, wherein a subject is transported by a drum past a viewing port of the CCD detector assemblies.

With reference to FIG. 5, there is shown an imaging system 20A which is a preferred embodiment of the system 20 portrayed in FIG. 1. The principles of the invention set forth in the description of the system of FIG. 1 apply also to the embodiment of FIG. 5. The system 20A of FIG. 5 comprises a bed 80 upon which the subject 24 is advanced for viewing by a CCD detector assembly 82. At an aperture 84 in the bed 80, there are located interfacing surfaces of a drum 86 and two rollers 88 and 90 which press against the drum 86 in the absence of the subject 24, and which squeeze the subject 24 against the drum 86 during presence of the subject 24 at the aperture 84. The drum 86 is driven by a stepper motor 92 connected to the drum 86 by a belt 94 driven by an output pinion 96 of the motor 92. The surface of the drum 86 provides a secure friction grip with the subject 24 so as to advance the subject 24 in a line-by-line fashion in response to successive rotational increments of the motor 92. Interrupters 98 and 100 are provided for signaling locations of edges of the subject 24. Each of the interrupters 98 and 100 may be constructed in a well-known fashion employing an LED (light-emitting diode) transmitter and receiver for generating an electric signal designating the presence or absence of an LED beam of light due to the absence of or presence, respectively, of the subject 24.

Light illuminating the subject 24 is provided by the lamp 30, previously described in FIG. 1. Rays of light from the lamp 30 are reflected off of a planar mirror 102 and pass through a polarizer 104 onto the site where the subject 24 is to be viewed. The viewing site is located midway between the two rollers 88 and 90 on the front surface of the subject 24, as the subject 24 presses against the surface of the drum 86. It is noted that the subject 26 is placed initially on the bed 80 manually, and guided manually through the first interrupter 98 up to the roller 88, at which point the roller 88 with the drum 86 grab the leading edge of the subject 24 to automatically feed the subject 24 through the viewing site. Rays of light reflected from the subject 24 propagate along an optical path undergoing reflection sequentially at two mirrors 106 and 108 and pass through a second polarizer 110 and a focusing lens 112 to impinge upon the CCD detector assembly 82.

The two polarizers 104 and 110 are useful in enhancing the SNR by excluding unwanted scattered light from scratches that may be on the subject 24. The concavity of the reflector 34 of the lamp 30 provides for a uniform illumination of the successive scan lines of the subject 24, and the lens 112 brings the scan lines successively to a sharp focus upon the array of CCD cells in the CCD detector assembly 82. Output signals of the CCD detector assembly 82, produced upon detection of the pixels of the successive scan lines of the subject 24, are applied to a suitable signal processor (not shown in FIG. 5) for developing of an image as has been described in FIG. 1.

Figure 6:
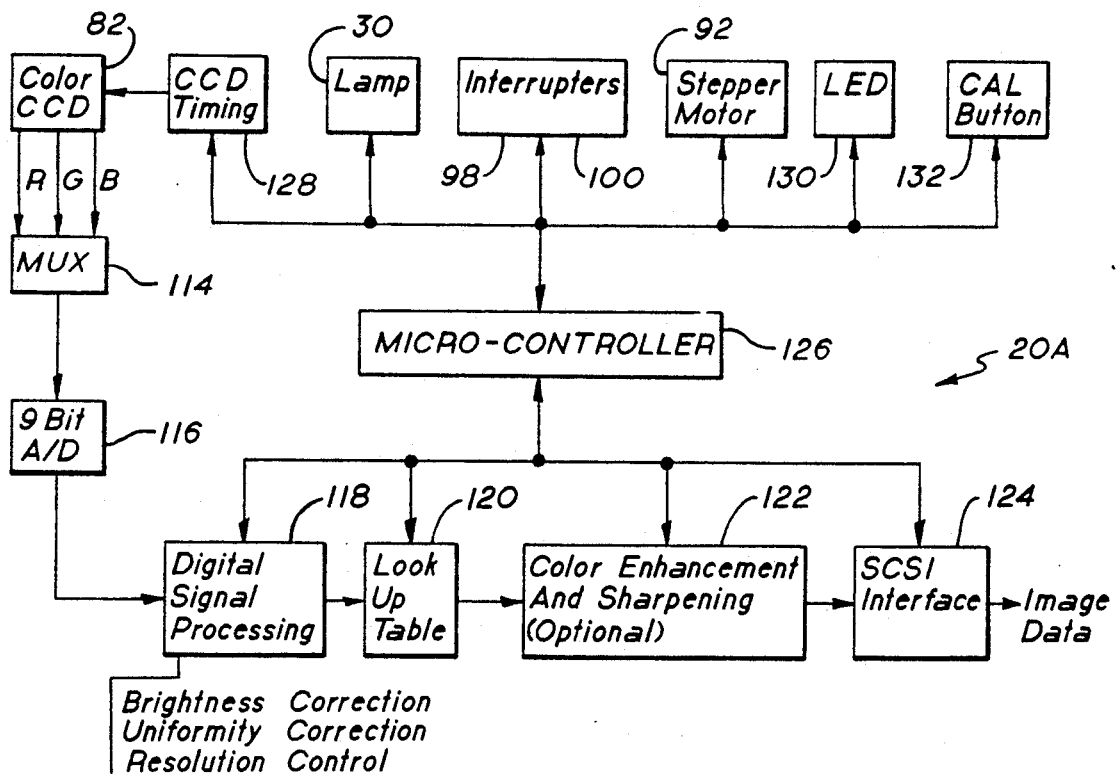
FIG. 6 is a block diagram of electronic circuitry employed in the imaging system of FIG. 5.

FIG. 6 shows electrical circuitry connected to elements of the system 20A shown in FIG. 5. FIG. 6 shows the CCD color detector assembly 82, the lamp 30, the interrupters 98 and 100, and the stepper motor 92 disclosed in FIG. 5. In FIG. 6, red, green and blue output signals of the detector assembly 82 are multiplexed by a multiplexer 114 and applied to an analog-to-digital converter 116. The converter 116 provides for nine-bit digital signals. The circuitry of FIG. 6 further comprises a digital signal processing unit 118, a look-up table (read-only memory) 120, an optional color enhancement and sharpening unit 122, a SCSI (small computer system interface) 124, a microcontroller or computer 126, a timing unit 128 for operation of CCD circuits in the assembly 82, and LED (light-emitting diode) 130 and a calibration button 132. The signal processing unit 118 provides for brightness correction, uniformity correction, and resolution control. This is accomplished by use of the nine-bit digital words from the converter 116.

Resolution control can be attained in one dimension by advancing the subject 24 a greater distance between successive line scans and by advancing the charge at a higher rate proportional to the increase in scanning speed. Resolution in a direction transverse to the direction of movement of the subject 24 can be reduced by skipping over adjacent cells of the CCD registers 58 (FIG. 2). By averaging pairs of the cells, the resolution is cut in half. This permits the resolution to be selected in accordance with needs of a user of the imaging system. Output signals of the processing unit 118 are converted to 8-bit bytes at the look-up table 120, and then applied to the enhancement circuit 122 to be outputted via the SCSI interface 124, the interface 124 being suitable for outputting data to certain computers (not shown) employing such interface for display of an image on a screen of the computer.

Figure 7:
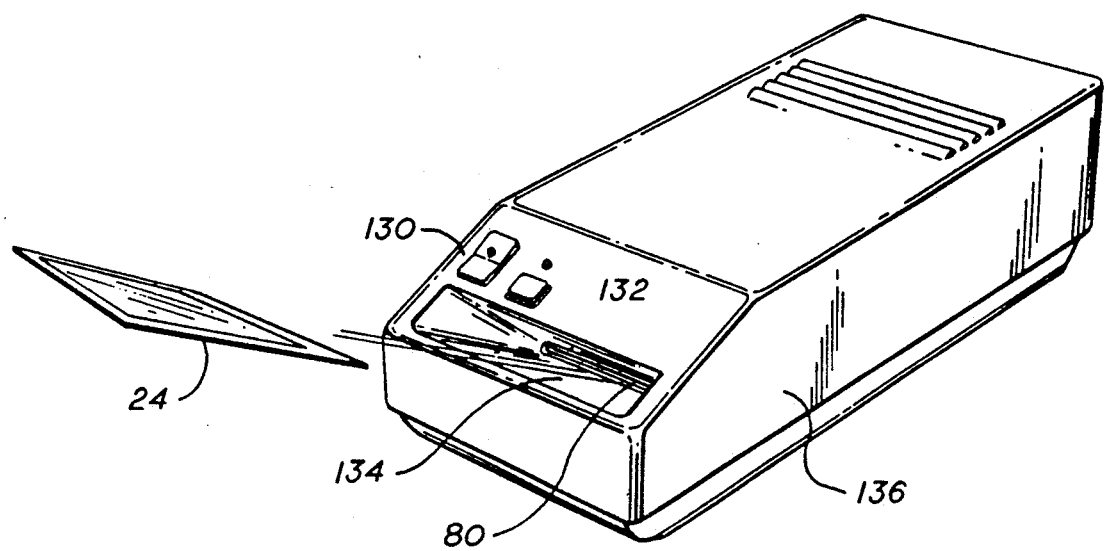
FIG. 7 shows a case enclosing the system of FIG. 5.

Control of motion of the subject 24 is accomplished in accordance with the following procedure. The first interrupter 98, upon sensing the leading edge of the subject 24, signals the controller 126 to activate the stepper motor 92 in the forward direction for advancing the subject 24 along the bed 80. With reference also to FIG. 7, the forward driving of the motor 92 draws the subject 24 into an entrance port 134 of a case 136 which encloses the system 20A. The subject 24 continues to pass along the bed 80 on a path through the second interrupter 100, the drum 86 continuing to advance the subject 24 until the leading edge thereof has passed through both of the interrupters 98 and 100.

A predetermined time after the interrupter 98 shows the absence of the subject 24, the controller 126 responds by reversing the direction of the motor 92, and by operating the motor 92 in a relatively low speed, line-by-line scanning mode. The controller 126 activates the timing unit 128 to operate the CCD registers of the assembly 82, and to conduct the imaging operations in the manner taught with respect to FIG. 1. In the system 20A, the imaging operations include signal processing by the processing unit 118 and the enhancement unit 122. Operation of the units 118 and 122 is directed by the controller 126. As the subject 24 proceeds in the reverse direction along the bed 80, the subject 24 passes through the interrupters 100 and 98. Upon clearing the interrupter 100, the stepper motor 92 is stopped within a predetermined time interval by the controller 126, at which point in time the subject 24 extends from the port 134 of the case 136.

The LED 130 is located on the front side of the case 136. The calibration button 132 is mounted alongside the LED 130. The controller 126 operates the LED 130 to light the LED when the system is ready to receive the subject, the LED 130 being off during scanning of the subject 24. The controller 126 causes the LED 130 to blink at the conclusion of a scanning process. The calibration button 132 signals the controller 126 to operate the scanning process with a test subject. If desired, the lamp 30 may include a halogen gas activated by a tungsten filament, and may include an infrared filter to prevent excessive heating of the subject 24.

Figure 8:
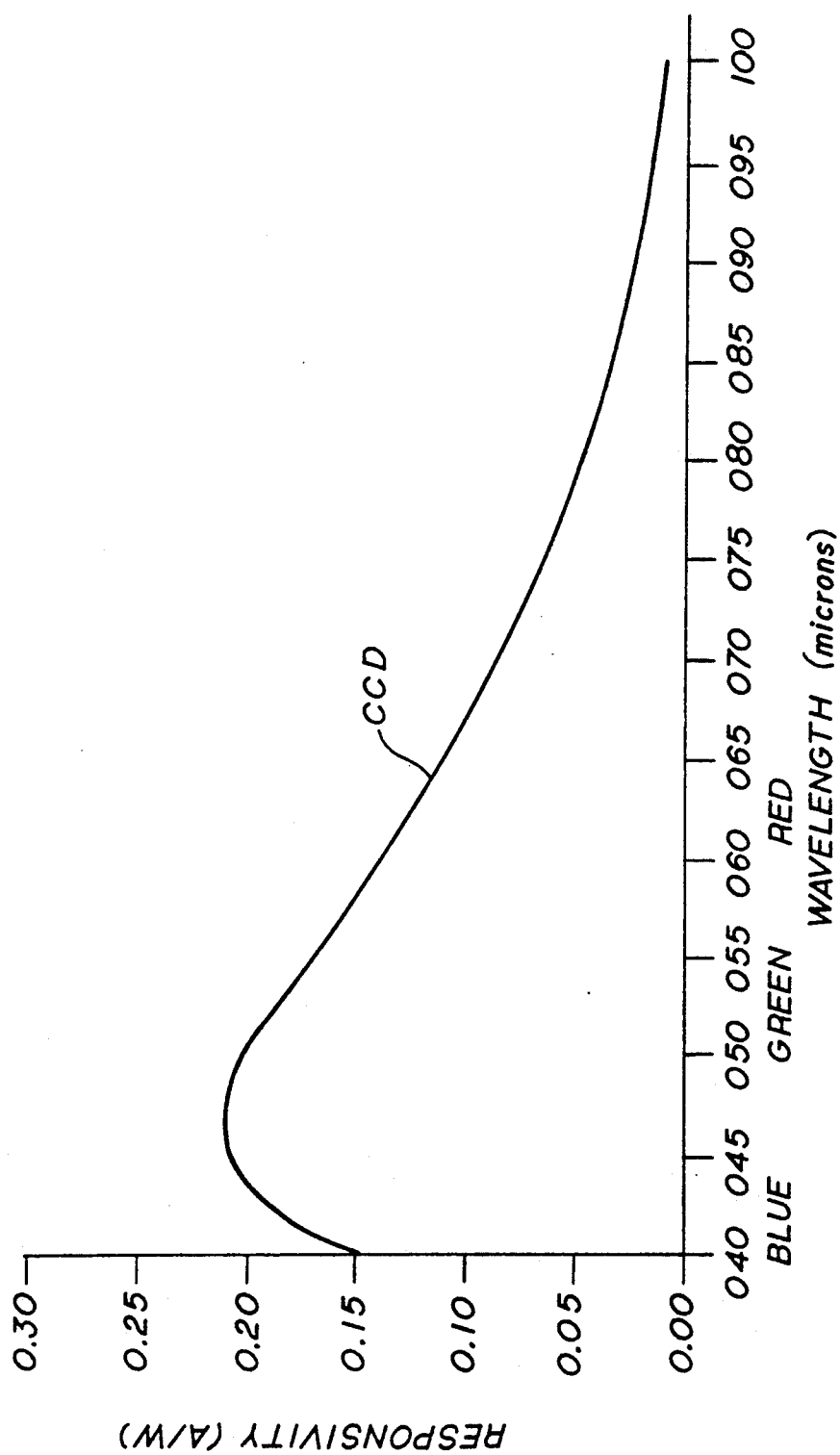
FIG. 8 is a graph showing spectral responsivity of a charge-coupled device to light.
Figure 9:
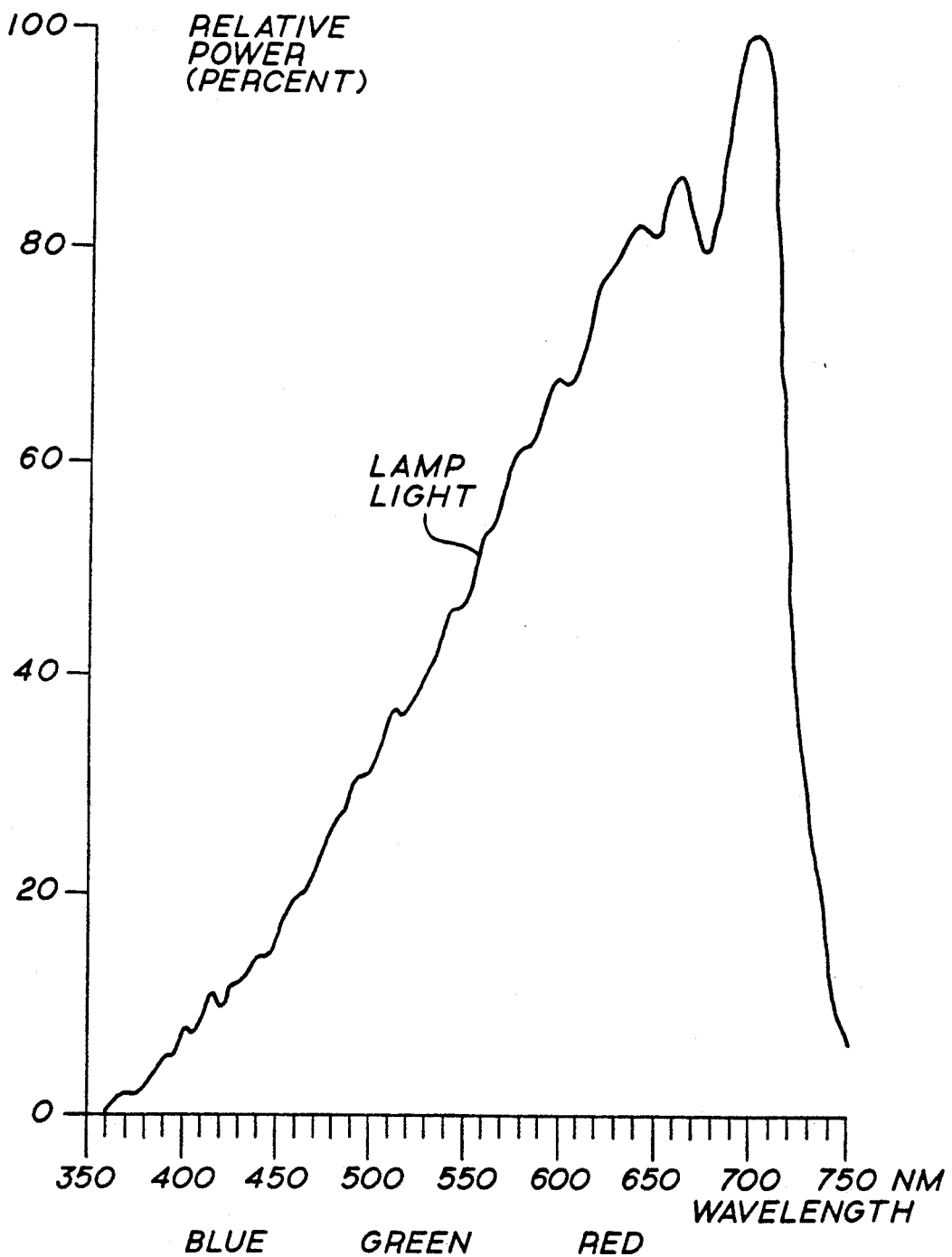
FIG. 9 shows spectral output power of a lamp which may be employed in the imaging system.
Figure 10:
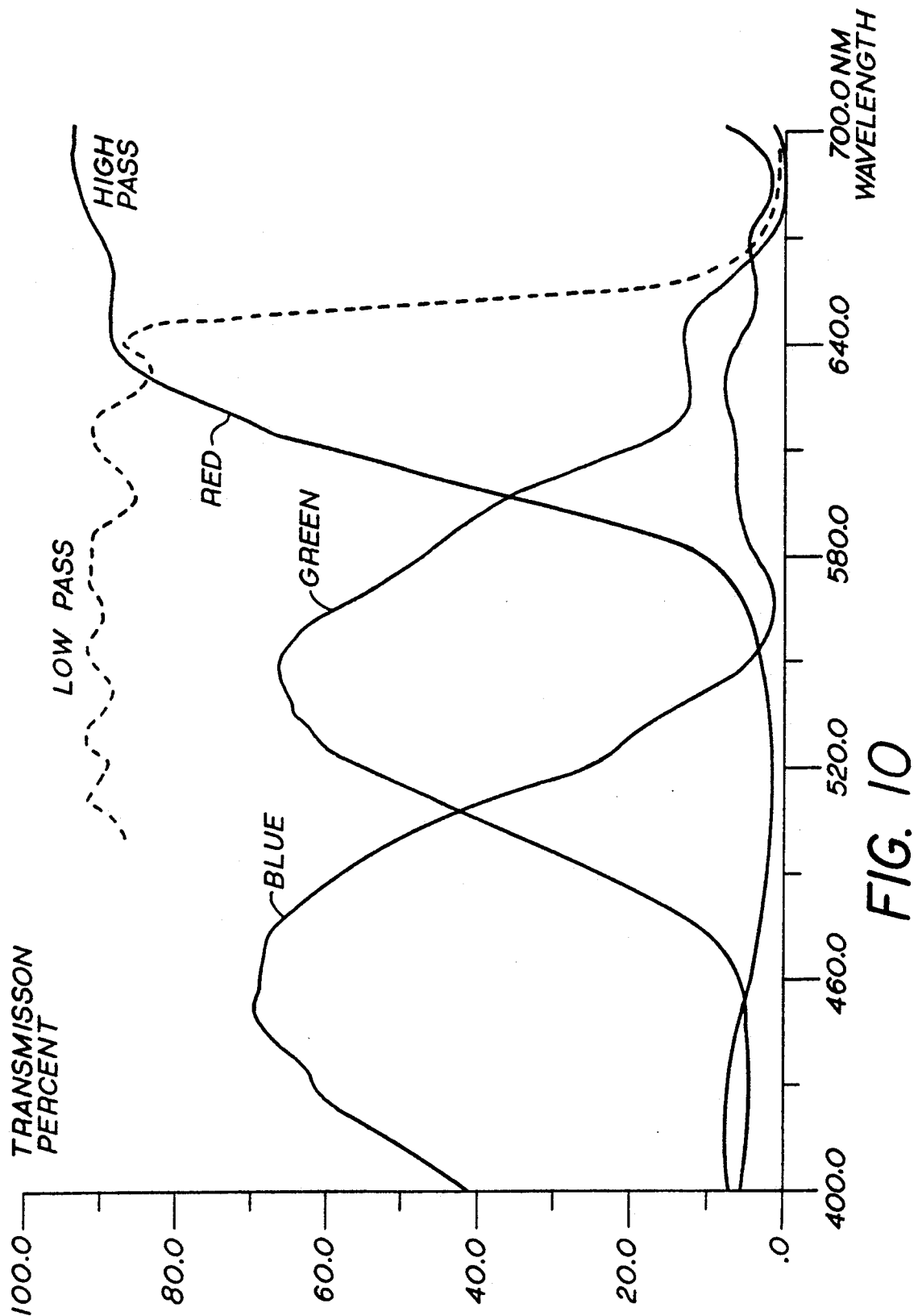
FIG. 10 shows spectral responses of filters which may be employed in construction of the detector assemblies.

FIGS. 8, 9, and 10 show variations in response as a function of wavelength of the light. FIG. 8 shows the variation in responsivity of a CCD fabricated of silicon as a function of wavelength, the responsivity being based on the number of amperes of CCD current generated per watt of detected radiation. The responsivity peaks at a region between blue and green light. FIG. 9 shows variation in the relative power outputted by the lamp employed for illuminating the subject. The radiation emitted by the lamp has a peak power at approximately 700 nm (nanometers) wavelength and drops to zero at approximately 360 nm wavelength. This corresponds to a relatively high intensity in the red portion of the spectrum and relatively low intensity at the blue portion of the spectrum. FIG. 10 shows the transmission characteristic of a bandpass filter employed for blue light, a bandpass filter employed for green light, and a pair of two filters, namely a low pass filter and a high pass filter, which are combined to provide a single passband for red light. On the vertical axis, 100 percent represents complete transparency, with the lower values indicating attenuation at optical signals propagating through the filters.

A combination of the responsivities of the foregoing three graphs are employed to determine the amount of compensation required by the three sets of CCD registers disclosed in FIG. 3, wherein a larger number of registers are required to detect light when the light is of a low intensity, and wherein a smaller number of registers are activated to detect light when the light is of a relatively high intensity. The foregoing teaching of the invention provide a more uniform production of images with respect to the various color components while maintaining a high signal-to-noise ratio for accurate production of an image of the subject.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A color balanced detector system comprising:
   plural sets of detectors, each of said detectors detecting light from a subject, the detectors of each of said detector sets detecting a spectral portion of the light different from the spectral portion of the light detected by the detectors of another of said detector sets;
   means for scanning light from successive portions of the subject to said detector sets along a predetermined scanning path; and wherein
   each of said detector sets comprises a plurality of detectors arranged in a two dimensional array of rows and columns, the columns being parallel to said scanning path and the rows being transverse to said scanning path, each of said detectors providing a signal in response to a detection of light;
   means synchronized with said scanning means for triggering said detectors to provide their respective signals in synchronism with the scanning along said scanning path;
   means for summing signals provided by said detectors in each column to provide a column signal for each column of a detector set; and
   means for retrieving column signals of the respective detector sets to provide imaging data of said subject.

2. A system according to claim 1 wherein said scanning means introduces a scanning movement between said subject and said detectors.

3. A system according to claim 1 wherein each of said detectors includes a storage element capable of storing a signal larger than the signal generated from light incident to its detector, said summing means comprising the signal storage elements in each of said detector sets.

4. A system according to claim 3 wherein each of said storage elements comprises a cell of a charge-coupled device, there being one charge-coupled device for each row of said array.

5. A system according to claim 4 wherein said summing means further comprises, in each of said detector sets, electrical connections between successive ones of said cells disposed along respective ones of said columns to provide a column signal for each column 6. A system according to claim 1 further comprising a set of filter wherein separate filters are optically coupled to respective ones of said detector sets for filtering light of the subject, each of said filters providing a passband for one of said spectral portion.

7. A system according to claim 6 wherein there are three of said detector sets, and wherein the respective filters provide passbands, respectively, for a red portion, a green portion, and a blue portion of the light spectrum.

8. A color balanced detector system comprising:

plural sets of detectors, each of said detectors detecting light form a subject, the detectors of each of said detector sets detecting a spectral portion of the light different from the spectral portion of the light detected by the detectors of another of said detector sets;

means for scanning light from successive portions of the subject to said detector sets along a predetermined scanning path; and wherein each of said detector sets comprises a plurality of detectors arranged in a two-dimensional array of rows and columns, the columns being parallel to said scanning path and the rows being transverse to said scanning path, each of said detectors providing a signal in response to a detection of light;

means synchronized with said scanning means for triggering said detectors to provide their respective signals in synchronism with the scanning along said scanning path;

means for summing signals provided by said detectors in each column to provide a column signal for each column of a detector set; and means for retrieving column signals of the respective detector sets to provide imaging data of said subject wherein, in one of said detector sets, there is a first number of rows of detectors providing signals in response to a detection of light, and in a second of said detector sets there is a second number of rows of detectors providing signals in response to the detection of light, the first number of rows being greater than the second number of rows by an amount corresponding to the decrease in the intensity of spectral portions of the light of the subject detected by the first number of rows in comparison to that detected by the second number of rows to improve equality of signal-to-noise ratio in signals outputted by detectors in response to light of different portions of the spectrum.

9. A system according to claim 8 further comprising:
a set of filters wherein separate filters are optically coupled to respective ones of said detector sets for filtering light of the subject, each of said filters providing a passband for one of said spectral portions; and wherein said scanning means introduces a scanning movement between said subject and said detectors;

each of said detectors includes a storage element capable of storing a signal larger than the signal generated from light incident to its detector, said summing means comprising the signal storage elements in each of said detector sets;

said storage elements are arranged along rows of said array of detectors, each of said storage elements being a cell of a charge-coupled device, there being one charge-coupled device for each row of said array; and wherein said summing means further comprises, in each of said detector sets, electrical connections between successive ones of said cells disposed along respective ones of said columns to provide a column signal for each column.

10. A system according to claim 8 further comprising a set of filters wherein separate filters are optically coupled to respective ones of said detector sets for filtering light of the subject, each of said filters providing a passband for one of said spectral portions; and wherein there are three of said detector sets, and the filters provide passbands, respectively, for a red portion, a green portion, and a blue portion of the light spectrum.

11. A system according to claim 8 wherein said scanning means introduces a scanning movement between said subject and said detectors.

12. A system according to claim 8 wherein each of said detectors includes a storage element capable of storing a signal larger than the signal generated form light incident to its detector, said summing means comprising the signal storage elements in each of said detector sets.

13. A system according to claim 12 wherein each of said storage elements comprises a cell of a charge-coupled device, there being one charge-coupled device for each row of said array.

14. A system according to claim 12 wherein said summing means further comprises, in each of said detector sets, electrical connections between successive ones of said cells disposed along respective ones of said columns to provide a column signal for each column.

15. A system according to claim 8 further comprising a set of filters wherein separate filters are optically coupled to respective ones of said detector sets for filtering light of the subject, each of said filters providing a passband for one of said spectral portion.

16. A system according to claim 15 wherein there are three of said detector sets, and wherein the respective filters provide passbands, respectively, for a red portion, a green portion, and a blue portion of the light spectrum.

* * * * *